(12) United States Patent
Park

(10) Patent No.: US 11,733,739 B2
(45) Date of Patent: Aug. 22, 2023

(54) DISPLAY APPARATUS

(71) Applicant: SAMSUNG DISPLAY CO., LTD., Yongin-si (KR)

(72) Inventor: Chang Min Park, Gwangmyeong-si (KR)

(73) Assignee: SAMSUNG DISPLAY CO., LTD., Yongin-si (KR)

( * ) Notice: Subject to any disclaimer, the term of this patent is extended or adjusted under 35 U.S.C. 154(b) by 419 days.

(21) Appl. No.: 16/934,926

(22) Filed: Jul. 21, 2020

(65) Prior Publication Data
US 2021/0055763 A1 Feb. 25, 2021

(51) Int. Cl.
*G06F 1/16* (2006.01)
(52) U.S. Cl.
CPC .......... *G06F 1/1681* (2013.01); *G06F 1/1652* (2013.01); *E05Y 2900/606* (2013.01)
(58) Field of Classification Search
CPC ....... G06F 1/1681; G06F 1/1652; G09F 9/301
See application file for complete search history.

(56) References Cited

U.S. PATENT DOCUMENTS

| 9,269,748 | B2 | 2/2016 | Liu et al. | |
|---|---|---|---|---|
| 10,664,021 | B1 * | 5/2020 | Hsu | G06F 1/1626 |
| 2019/0166703 | A1 * | 5/2019 | Kim | H05K 5/0226 |
| 2020/0409427 | A1 * | 12/2020 | Hsu | E05D 1/04 |
| 2021/0026407 | A1 * | 1/2021 | Park | H04M 1/022 |

FOREIGN PATENT DOCUMENTS

| KR | 10-1139866 | 4/2012 |
|---|---|---|
| KR | 10-2012-0064585 | 6/2012 |
| KR | 10-1686141 | 12/2016 |

* cited by examiner

*Primary Examiner* — Anthony Q Edwards
*Assistant Examiner* — Bryan Van Huynh
(74) *Attorney, Agent, or Firm* — F. Chau & Associates, LLC

(57) ABSTRACT

A foldable display apparatus includes a flexible display panel, a first plate and a second plate that support the flexible display panel and are disposed in a same plane when the foldable display apparatus is in an unfolded state, and a hinge assembly coupled to the first plate and the second plate such that the first plate rotates about a first rotation axis and at the same time the second plate rotates about a second rotation axis. The first rotation axis and the second rotation axis are located on or above surfaces of the first and second plates in the unfolded state.

17 Claims, 14 Drawing Sheets

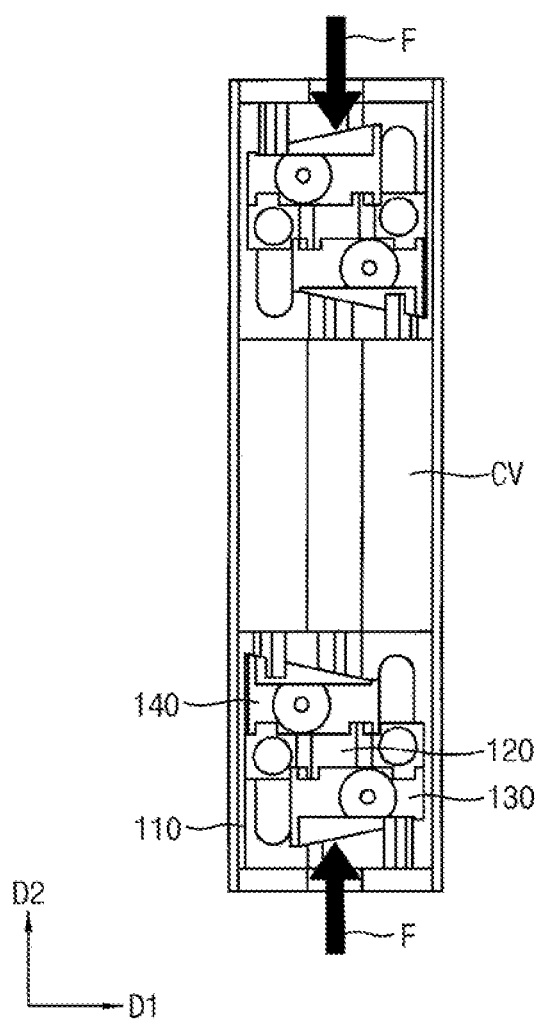

DISPLAY APPARATUS

This application claims priority under 35 U.S.C. § 119 from, and the benefit of Korean Patent Application No. 10-2019-0100874, filed on Aug. 19, 2019 in the Korean Intellectual Property Office, the contents of which are herein incorporated by reference in their entirety.

BACKGROUND

1. Technical Field

Exemplary embodiments of the inventive concept rare directed to a display apparatus. More particularly, exemplary embodiments of the inventive concept are directed to an unfolding type foldable display apparatus that has an improved hinge structure.

2. Discussion of the Related Art

Recently, a small, light weight display apparatus has been manufactured. Previously, cathode ray tube (CRT) display apparatuses have been used due to performance and competitive prices. However a CRT display apparatus is large and not very portable. Therefore, display apparatuses such as a plasma display apparatus, a liquid crystal display apparatus or an organic light emitting display apparatus have become popular due to their small size, light weight and low-power-consumption.

Recently, a flexible display apparatus that can be bent has been developed. A study was performed to incorporate a flexible display apparatus into a foldable mobile device. In this case, a flexible display apparatus was disposed across two bodies with a hinge structure, thereby providing a large screen. However, when a flexible display apparatus is fully folded, the flexible display apparatus itself may be damaged. Therefore, a hinge structure is needed that can limit a radius of curvature of bending the flexible display apparatus when the mobile device is folded.

SUMMARY

One or more exemplary embodiments of the inventive concept provides a foldable display apparatus that has an improved hinge structure.

According to an exemplary embodiment of the inventive concept, a foldable display apparatus includes a flexible display panel, a first plate and a second plate that support the flexible display panel and are disposed in a same plane when the flexible display panel is in an unfolded state, and a hinge assembly coupled to the first plate and the second plate such that the first plate rotates about a first rotation axis and at the same time the second plate rotates about a second rotation axis. The first rotation axis and the second rotation axis are located on or above surfaces of the first and second plates in the unfolded state.

In an exemplary embodiment, the hinge assembly includes a first assembly that includes a first cam rotation part fixed onto a lower surface of the first plate, a second cam rotation part fixed onto a lower surface of the second plate, a cam guide disposed between the first cam rotation part and the second cam rotation part and that guides rotation of the first and second cam rotation parts, and a cam slider that slides parallel to a direction of the first rotation axis and the second rotation axis in accordance with rotations of the first and second cam rotation parts, and a cover that receives the first assembly. The cam guide is fixed to the cover.

In an exemplary embodiment, the cam guide includes a first rotation guide and a second rotation guide. The first cam rotation part of the first assembly may include a first rotation guide coupling portion coupled to the first rotation guide of the cam guide to be guided, and a first cam inclined portion formed on an opposite surface of the first rotation guide coupling portion. The second cam rotation part of the first assembly may include a second rotation guide coupling portion coupled to the second rotation guide of the cam guide to be guided, and a second cam inclined portion formed on an opposite surface of the second rotation guide coupling portion.

In an exemplary embodiment, the cam slider of the first assembly includes a first cam guide that guides the first cam inclined portion of the first cam rotation part, and a second cam guide that guides the second cam inclined portion of the second cam rotation part.

In an exemplary embodiment, in the unfolded state, the first cam inclined portion and the second cam inclined portion are inclined in a same direction, and the first cam inclined portion and the second cam inclined portion are spaced apart in opposite directions with the cam guide therebetween.

In an exemplary embodiment, the cam slider of the first assembly includes a first fixed portion adjacent to the first cam guide and that limits a rotation range of the first cam rotation part, and a second fixed part adjacent to the second cam guide and that limits a rotation range of the second cam rotation part.

In an exemplary embodiment, the cam slider of the first assembly includes a slide opening that extends in a direction parallel to the first rotation axis and the second rotation axis. The cam guide is fixed to the cover by a fixing member that passes through the slide opening.

In an exemplary embodiment, the cover includes a slide protrusion, and the cam slider of the first assembly includes a slide guide portion that receives the slide protrusion.

In an exemplary embodiment, the display apparatus further includes a second assembly received in the cover. The second assembly includes a first cam rotation part fixed onto the lower surface of the first plate, a second cam rotation part fixed onto the lower surface of the second plate, a cam guide disposed between the first cam rotation part and the second cam rotation part and that guides rotation of the first and second cam rotation parts, and a cam slider that slides parallel to the direction of the first rotation axis and the second rotation axis in accordance with rotations of the first and second rotation parts. The first assembly and the second assembly are symmetrically arranged with respect to a center of the display apparatus in a plan view.

In an exemplary embodiment, when the display apparatus is folded or unfolded, a sliding direction of the cam slider of the first assembly is opposite to a sliding direction of the cam slider of the second assembly.

In an exemplary embodiment, the display apparatus further includes a third assembly received in the cover. The third assembly includes a first rotation part fixed onto the lower surface of the first plate, a second rotation part fixed onto the lower surface of the second plate, and a guide fixed at the cover and disposed between the first rotation part and the second rotation part and that guides rotation of the first and second rotation parts.

In an exemplary embodiment, the first rotation axis and second rotation axis are spaced apart from each other.

In an exemplary embodiment, in the unfolded state, the first and second rotation axes are located in the flexible panel.

According to an exemplary embodiment of the inventive concept, a display apparatus includes a flexible display panel, a first plate and a second plate that support the flexible display panel, and a hinge assembly coupled to the first plate and the second plate. The hinge assembly includes a first assembly that includes a first cam rotation part fixed onto a lower surface of the first plate, a second cam rotation part fixed onto a lower surface of the second plate, a cam guide disposed between the first cam rotation part and the second cam rotation part and that guides rotation of the first and second cam rotation parts, and a cam slider that slides parallel to a direction of a first rotation axis and a second rotation axis in accordance with rotations of the first and second cam rotation parts, and a cover that receives the first assembly. The cam guide is fixed to the cover.

In an exemplary embodiment, the cam guide includes a first rotation guide and a second rotation guide. The first cam rotation part of the first assembly includes a first rotation guide coupling portion coupled to the first rotation guide of the cam guide, and a first cam inclined portion formed on an opposite surface of the first rotation guide coupling portion. The second cam rotation part of the first assembly includes a second rotation guide coupling portion coupled to the second rotation guide of the cam guide, and a second cam inclined portion formed on an opposite surface of the second rotation guide coupling portion.

In an exemplary embodiment, the first rotation axis and the second rotation axis are located on or above surfaces of the first and second plates in an unfolded state.

In an exemplary embodiment, the flexible display panel includes a first rigid area fixed to the first plate, a second rigid area fixed to the second plate, and a foldable area disposed between the first rigid area and the second rigid area. When the display apparatus is folded, the foldable area is spaced apart from the first and second plates. When the display apparatus is unfolded, the foldable area is in contact with the first and second plates.

In an exemplary embodiment, the first and second rotation axes are located in the flexible display panel when the flexible display panel is unfolded.

In an exemplary embodiment, the display apparatus further includes a second assembly received in the cover. The second assembly includes a first cam rotation part fixed onto the lower surface of the first plate, a second cam rotation part fixed onto the lower surface of the second plate, a cam guide disposed between the first cam rotation part and the second cam rotation part and that guides rotation of the first and second cam rotation parts, and a cam slider that slides parallel to the direction of the first rotation axis and the second rotation axis in accordance with rotation of the first and second rotation parts.

According to the exemplary embodiments of the present inventive concept, a display apparatus includes a flexible display panel, a first plate and a second plate that support the flexible display panel and are disposed in a same plane when the flexible display panel is in an unfolded state, and a hinge assembly coupled to the first plate and the second plate. The first plate rotates about a first axis of rotation. At the same time, the second plate rotates about a second rotation axis. The hinge assembly also includes a first rotation guide and a second rotation guide, a first rotation guide coupling portion coupled to the first rotation guide, and a first cam inclined portion formed on an opposite surface of the first rotation guide coupling portion, and a second rotation guide coupling portion coupled to the second rotation guide, and a second cam inclined portion formed on an opposite surface of the second rotation guide coupling portion.

A display apparatus according to embodiments of the inventive concept can be symmetrically folded, and the first rotation axis and the second rotation axis are located on or above the surfaces of the first and second plates when the display apparatus is unfolded. Accordingly, even if the display apparatus is repeatedly folded and unfolded state, it is possible to minimize wrinkles of the folding area of the flexible display panel.

BRIEF DESCRIPTION OF THE DRAWINGS

FIGS. 9A to 9C illustrate operations of the first and second assemblies when a display apparatus of FIG. 1 is folded and unfolded.

DETAILED DESCRIPTION

Hereinafter, exemplary embodiments of the inventive concept will be explained in detail with reference to the accompanying drawings.

Figure 1:
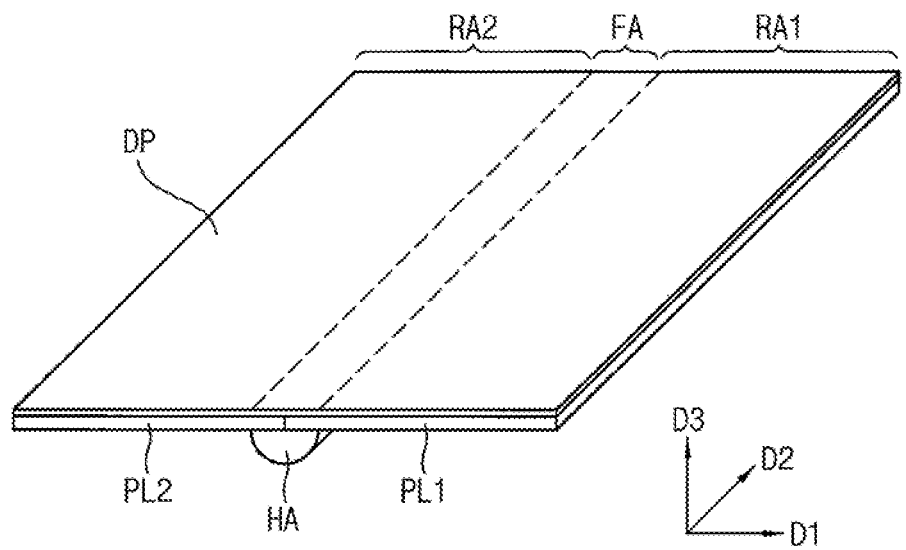
FIG. 1 is a perspective view of a display apparatus according to an exemplary embodiment of the inventive concept.
Figure 2A:
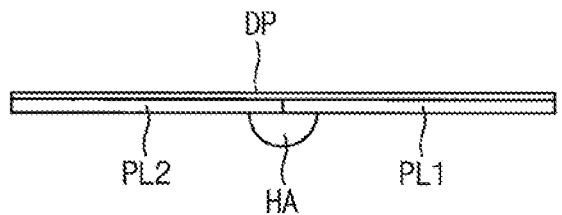
FIG. 2A is a cross-sectional view of a display apparatus of FIG. 1 when the display apparatus is unfolded.
Figure 2B:
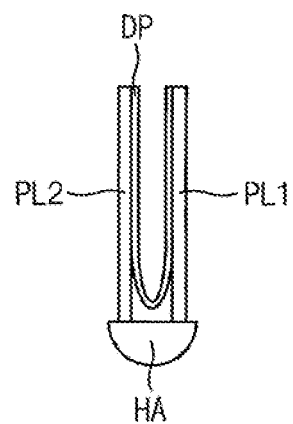
FIG. 2B is a cross-sectional view of a display apparatus of FIG. 1 when the display apparatus is folded.

FIG. 1 is a perspective view of a display apparatus according to an exemplary embodiment of the inventive concept. FIG. 2A is a cross-sectional view of a display apparatus of FIG. 1 when the display apparatus is unfolded. FIG. 2B is a cross-sectional view of a display apparatus of FIG. 1 when the display apparatus is folded.

Referring to FIGS. 1 to 2B, according to an embodiment, the display apparatus may include a flexible display panel DP, a first plate PL1, a second plate PL2, and a hinge assembly HA.

According to an embodiment, the flexible display panel DP is a flexible display panel on which an image is displayed. For example, the flexible display panel DP includes a flexible substrate and a plurality of pixels disposed on the flexible substrate that display an image. Each of the pixels includes a pixel circuit that includes a thin film transistor and a light emitting structure electrically connected to the pixel circuit. For example, the light emitting structure includes an organic light emitting element.

According to an embodiment, the flexible substrate is curved and includes a transparent insulating material suitable that supports conductive patterns and layers that are laminated together. For example, the flexible substrate include one of polyimide, polycarbonate, or polyethylene, etc.

According to an embodiment, the flexible display panel DP includes a first rigid area RA1 fixed to the first plate PL1, a second rigid area RA2 fixed to the second plate PL2, and a foldable area FA disposed between RA1 and the second rigid area RA2.

According to an embodiment, the first plate PL1 and the second plate PL2 are disposed below the flexible display panel DP and support the flexible display panel DP. As shown in the figure, the first plate PL1 supports a right side of the flexible display panel DP, and the second plate PL2 supports a left side of the flexible display panel DP. However, these sides are relative, and in other embodiments, the first plate PL1 supports the left side of the flexible display panel DP, and the second plate PL2 supports the right side of the flexible display panel DP. The first plate PL1 and the second plate PL2 are formed of a metal.

Figure 10A:
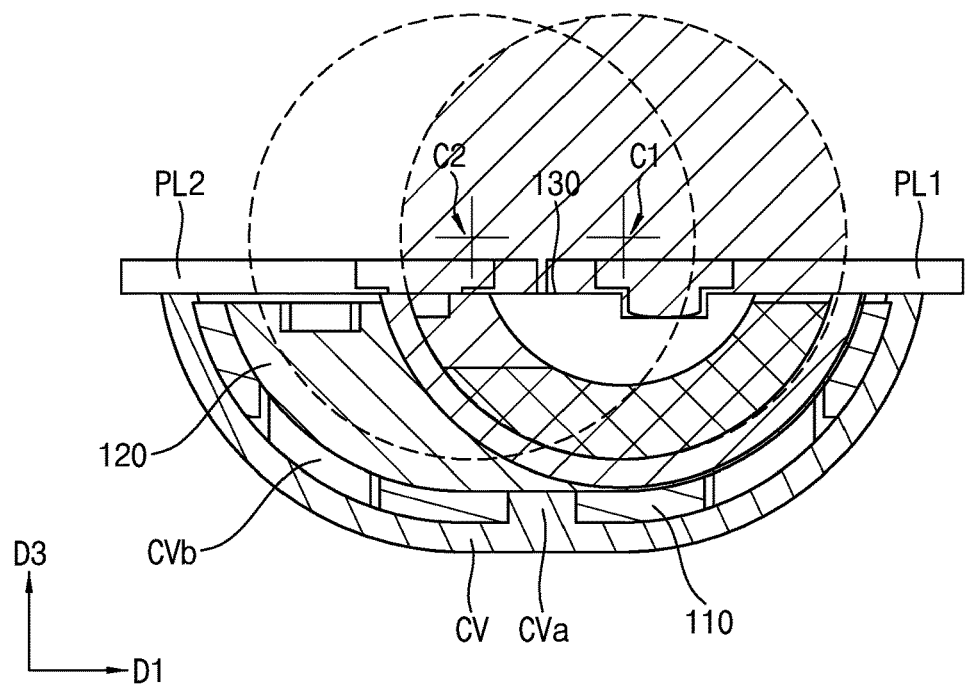
FIGS. 10A and 10B are cross-sectional views of a periphery of a first assembly when a display apparatus of FIG. 1 is unfolded and folded.
Figure 10B:
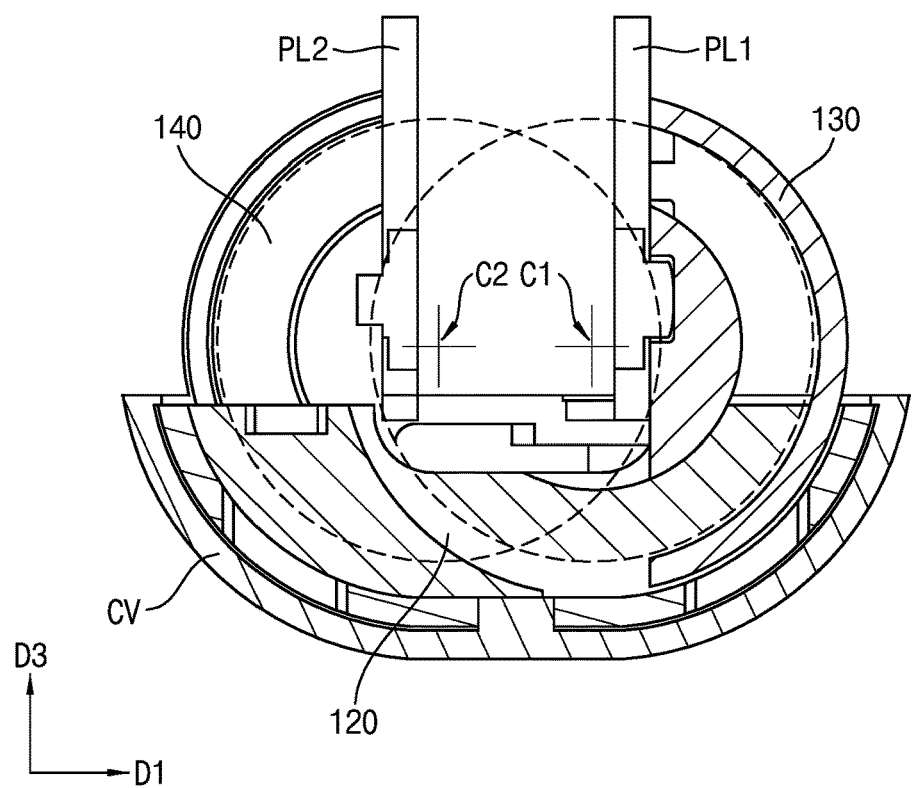

According to an embodiment, the hinge assembly HA is coupled to the first plate PL1 and the second plate PL2 such that the first plate PL1 rotates about a first rotation axis C1, shown in FIGS. 10A and 10B, and at the same time the second plate PL2 rotates about a second rotation axis C2, shown in FIGS. 10A and 10B.

According to an embodiment, the flexible display panel DP is bonded to the first and second plates PL1, PL2 in the first rigid area RA1 and the second rigid area RA2, respectively. The flexible display panel DP is not bonded to the first and second plates PL1 and PL2 in the foldable area FA.

Accordingly, according to an embodiment, when the display apparatus is in the unfolded state, the foldable area FA of the flexible display panel DP is unfolded and contacts the first and second plates PL1 and PL2, as shown in FIG. 2A. When the display apparatus is folded, the foldable area FA of the flexible display panel DP is spaced apart from the first and second plates PL1 and PL2.

Thus, according to an embodiment, even if the display apparatus is repeatedly folded and unfolded, it is possible to minimize wrinkles of the foldable area FA of the flexible display panel DP.

In addition, according to an embodiment, the hinge assembly HA implements symmetrical folding such that the first plate PL1 rotates about the first rotation axis, and at the same time the second plate PL2 rotates about the second rotation axis. Therefore, even if the display apparatus is repeatedly folded and unfolded, wrinkles of the foldable area FA of the flexible display panel DP can be minimized.

Figure 3:
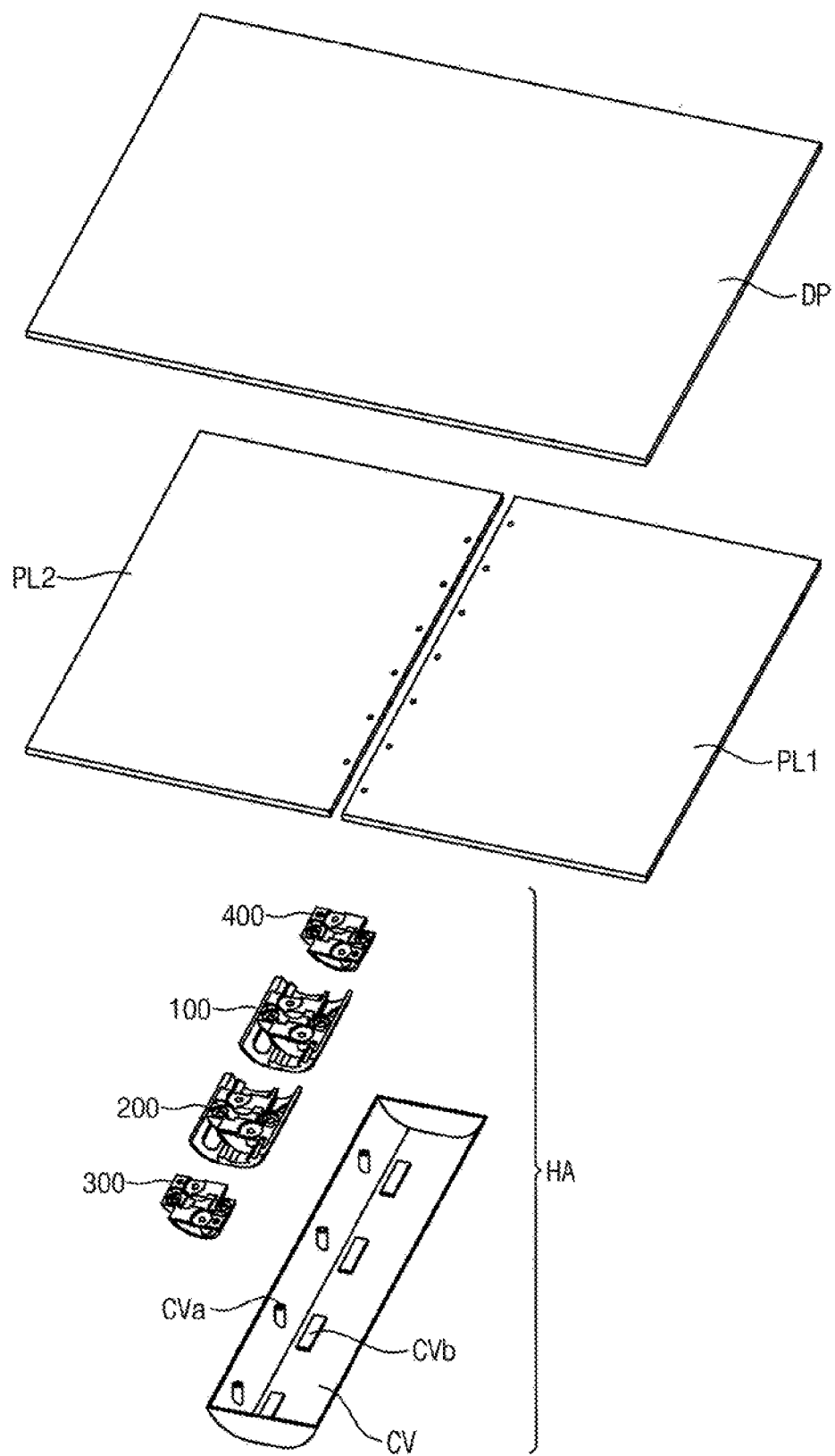
FIG. 3 is an exploded perspective view of a display apparatus of FIG. 1.

FIG. 3 is an exploded perspective view of a display apparatus of FIG. 1.

Referring to FIGS. 3, according to an embodiment, the display apparatus includes a flexible display panel DP, a first plate PL1, a second plate PL2, and a hinge assembly HA.

According to an embodiment, the hinge assembly HA includes a first assembly 100, a second assembly 200, a third assembly 300, a fourth assembly 400, and a cover CV.

According to an embodiment, the first assembly 100 and the second assembly 200 have a same configuration, and are installed opposite of each other. That is, the first assembly 100 and the second assembly 200 have the same configuration, and are symmetrically disposed with respect to a center of the display apparatus in a plan view.

According to an embodiment, the third assembly 300 and the fourth assembly 400 have the same configuration, and are installed on a same side or on opposite sides of the hinge assembly HA.

Figure 4:
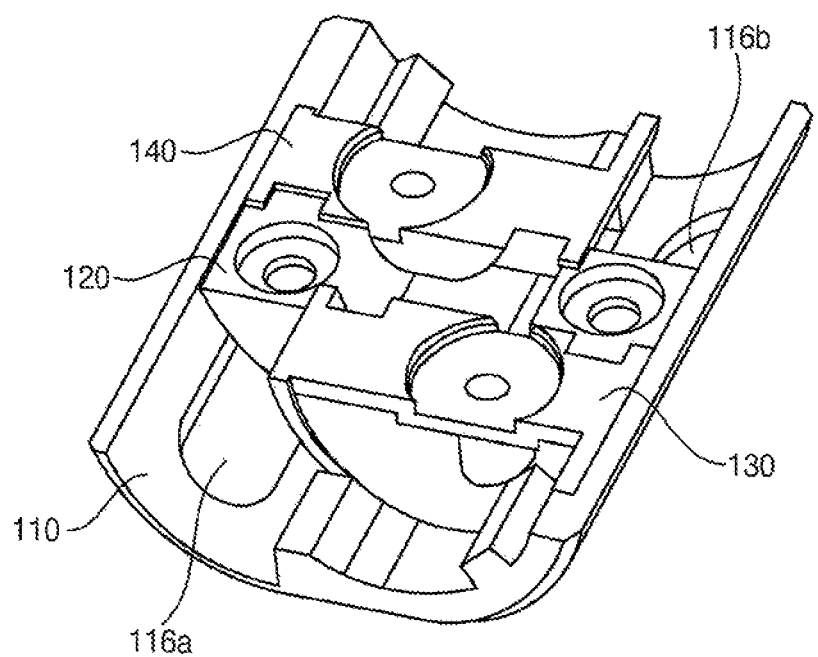
FIG. 4 is a perspective view of a first assembly 100 of a display apparatus of FIG. 1.

According to an embodiment, the first assembly 100 and the second assembly 200 each include a cam slider 110, shown in FIG. 4, so that the first plate PL1 and the second plate PL2 can be symmetrically folded at the same time.

According to an embodiment, the third assembly 300 and the fourth assembly 400 assist the folding of the first plate PL1 and the second plate PL2.

Detailed description of the first assembly 100 and the third assembly 300 will be presented with reference to FIGS. 4 to 8. The operation thereof will be described in detail with reference to FIGS. 8A to 8C, 9A to 9C, 10A and 10B.

Figure 5:
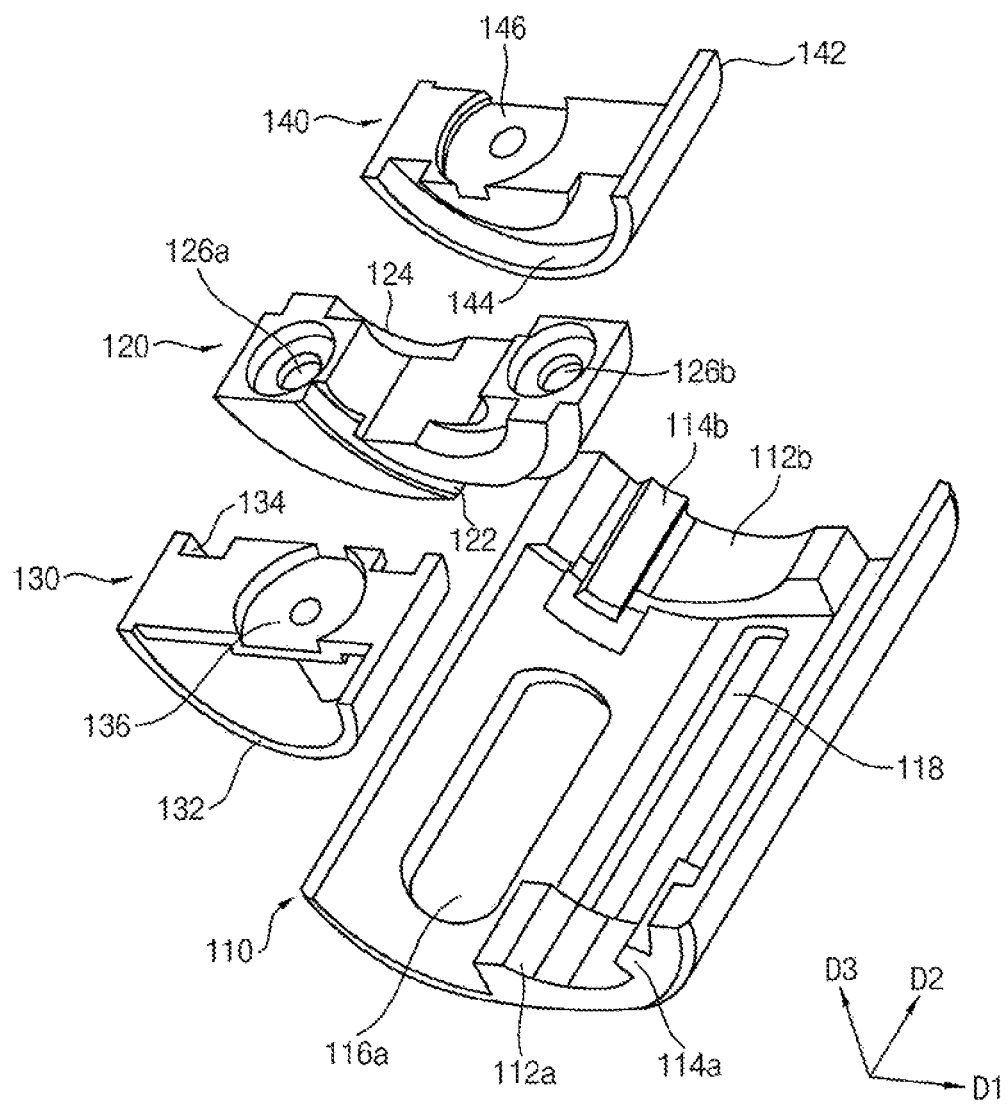
FIG. 5 is an exploded perspective view of the first assembly 100 of a display apparatus of FIG. 1.

FIG. 4 is a perspective view of a first assembly 100 of a display apparatus of FIG. 1. FIG. 5 is an exploded perspective view of the first assembly 100 of a display apparatus of FIG. 1. The second assembly 200 is substantially identical to the first assembly 100, and thus a repeated detailed description of the second assembly 200 will be omitted.

Referring to FIGS. 3, 4 and 5, according to an embodiment, the first assembly 100 includes a cam slider 110, a cam guide 120, a first cam rotation part 130 and the second cam rotation part 140.

According to an embodiment, the cam guide 120 includes a first rotation guide 122 and a second rotation guide 124.

According to an embodiment, the first cam rotation part 130 has a semi-cylindrical shape as a whole. That is, the first cam rotation part 130 has a semi-cylindrical shape with a flat surface and a height in the second direction D2, and a plate connecting portion 136 is formed on an upper surface of the first cam rotation part 130 to face the first plate PL1. A first cam inclined portion 132 extends in the second direction D2 from an outer periphery of the semi-cylinder on semicircular surfaces that face each other in the first direction D1 of the semi-cylinder. The first cam rotation part 130 also includes a first rotation guide coupling portion 134. Thus, the first cam rotation part 130 has a semi-cylindrical shape as a whole, and includes the first cam inclined portion 132 and the first rotation guide coupling portion 134 that are disposed at both sides of the first cam rotation part 130 in the second direction D2 in the drawing. The plate connecting portion 136 is formed on a surface of the third direction D3 in the drawing.

According to an embodiment, the first cam rotation part 130 is fixed on the bottom surface of the first plate PL1 by the plate connecting portion 136. For example, the plate connecting portion 136 has a recess formed thereon. The recess receives a protrusion on the bottom surface of the first plate PL1.

According to an embodiment, a protrusion on the bottom surface of the first plate PL1 is received in the recess. A fixing member such as a screw is received in the plate connecting portion 136 to fix the first cam rotation part 130 onto the bottom surface of the first plate PL1, as shown in FIGS. 10A and 10B.

According to an embodiment, the first cam inclined portion 132 has a width that changes along the second direction D2 along the curved surface of the first cam rotation part 130. In the drawing, the first cam inclined portion 132 is inclined so that the width in the second direction D2 increases along the first direction D1. The first cam inclined portion 132 contacts a first cam guide 112a of the cam slider 110. As the first cam rotation part 130 rotates, the first cam rotation part 130 pushes the first cam guide 112a of the cam slider 110 along a direction opposite to the second direction D2; or the first cam guide 112a moves, so that the first cam rotation part 130 can rotate.

According to an embodiment, the first rotation guide coupling portion 134 is coupled to the first rotation guide 122 of the cam guide 120 to guide rotation of the first cam rotation part 130.

According to an embodiment, the second cam rotation part 140 includes a second cam inclined portion 142, a second rotation guide coupling portion 144, and a plate connecting portion 146.

According to an embodiment, the second cam rotation part 140 has a semi-cylindrical shape as a whole. The second cam inclined portion 142 and the second rotation guide coupling portion 144 are disposed at both sides of the second cam rotation part 140 in the second direction D2 on the drawing, respectively. The plate connecting portion 146 is formed on a surface of the third direction D3 in the drawing.

According to an embodiment, the second cam inclined portion 142 has a width which changes along the second direction D2 along the curved surface of the second cam rotation part 140. In the drawing, the second cam inclined portion 142 is inclined so that the width in the second direction D2 increases along the first direction D1. The second cam inclined portion 142 contacts a second cam guide 112b of the cam slider 110. As the second cam rotation part 140 rotates, the second cam rotation part 140 pushes the second cam guide 112b of the cam slider 110 along the second direction D2; or the second cam guide 112b moves, so that the second cam rotation part 140 can rotate.

According to an embodiment, the second rotation guide coupling portion 144 is coupled to the second rotation guide 124 of the cam guide 120 to guide rotation of the second cam rotation part 140.

According to an embodiment, the second cam rotation part 140 is fixed on the bottom surface of the second plate PL2 by the plate connecting portion 146. For example, the plate connecting portion 146 has a recess formed thereon. A protrusion on the bottom surface of the second plate PL2 is received in the recess. A fixing member such as a screw is received in the plate connecting portion 146 to fix the second cam rotation part 140 onto the bottom surface of the second plate PL2.

Accordingly, the first cam inclined portion 132 and the second cam inclined portion 142 are inclined in the same direction. The first cam rotation part 130 and the second cam rotation part 140 are spaced apart in opposite directions with the cam guide 120 therebetween.

According to an embodiment, the cam slider 110 includes the first cam guide 112a, the second cam guide 112b, a first fixed portion 114a and a second fixed portion 114b. The cam slider 110 slides along the second direction D2 as the first cam rotation part 130 and the second cam rotation part 140 rotate. Therefore, the first cam rotation part 130 and the second cam rotation part 140 symmetrically rotate.

According to an embodiment, the first cam guide 112a is inclined to contact the first cam inclined portion 132. The second cam guide 112b is inclined to contact the second cam inclined portion 142. The first earn guide 112a guides the first cam inclined portion 132 of the first cam rotation part 130, and the second cam guide 112b guides the second cam inclined portion 142 of the second cam rotation part 140.

According to an embodiment, the first fixed portion 114a is adjacent to the first cam guide 112a and limits a rotation range of the first cam rotation part 130. The second fixed portion 114b is adjacent to the second cam guide 112b and limits a rotation range of the second cam rotation part 140. For example, the first fixed portion 114a and the second fixed portion 114b have protrusions that extend toward the first cam rotation part 130 and the second cam rotation part 140, respectively. A groove is formed at an end of each of the first cam rotation part 130 and the second cam rotation part 140 to engage the protrusion.

According to an embodiment, the cam slider 110 further includes a first slide opening 116a, a second slide opening 116b, and a slide guide portion 118.

According to an embodiment, the first slide opening 116a and the second slide opening 116b extend along the second direction D2 and through the cam slider 110.

According to an embodiment, cam guide 120 is fixed to the cover CV by a fixing member such as a screw that penetrates the first slide opening 116a and the second slide opening 116b, and a fixing protrusion CVb that protrudes from the cover CV. The cam slider 110 slides along the second direction D2. The slide guide portion 118 is an opening or a groove that receives a slide protrusion CVa in the cover CV. The slide guide portion 118 and the slide protrusion CVa limit a slide direction of the cam slider 110 to be parallel with the second direction D2. The cam slider 110 slides along the second direction D2.

According to an embodiment, the first rotation guide 122 is coupled to the first rotation guide coupling portion 134 of the first cam rotation part 130 to guide rotation of the first cam rotation part 130. The second rotation guide 124 is coupled to the second rotation guide coupling portion 144 of the second cam rotation part 140 to guide the rotation of the second cam rotation part 140.

For example, according to an embodiment, the first rotation guide 122 and the second rotation guide 124 are grooves formed on the cam guide 120. The first rotation guide coupling portion 134 and the second rotation guide coupling portion 144 are protrusions that extend toward the cam guide 120 on the first cam rotation part 130 and the second cam rotation part 140, respectively.

According to an embodiment, the cam guide 120 further includes a first screw hole 126a and a second screw hole 126b. The cam guide 120 is fixed to the cover CV by using a fixing member such as a screw in the first screw hole 126a and the second screw hole 126b.

Figure 6:
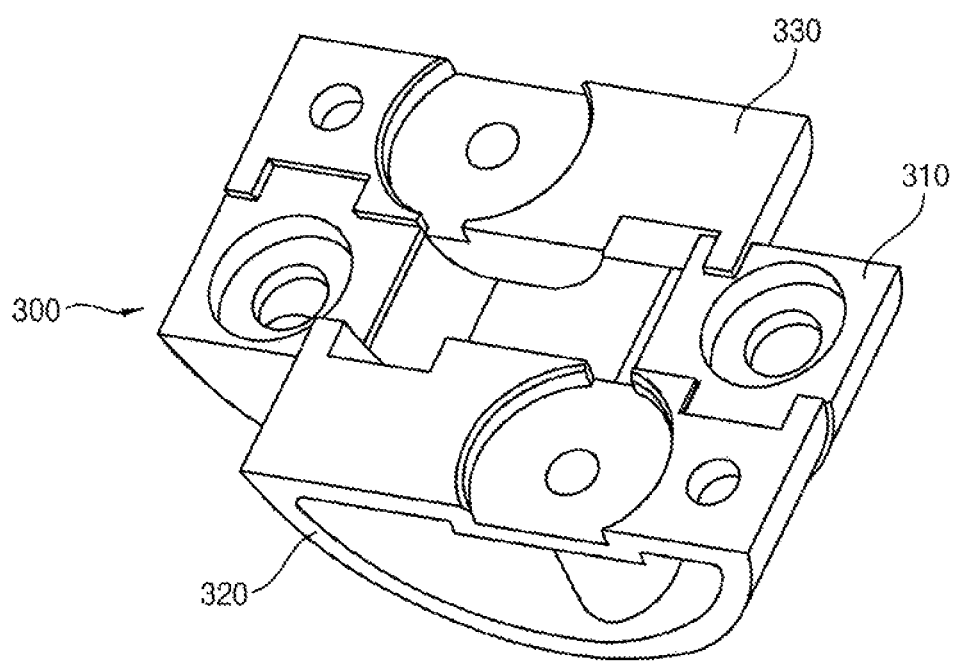
FIG. 6 is a perspective view of a third assembly 300 of a display apparatus of FIG. 1.
Figure 7:
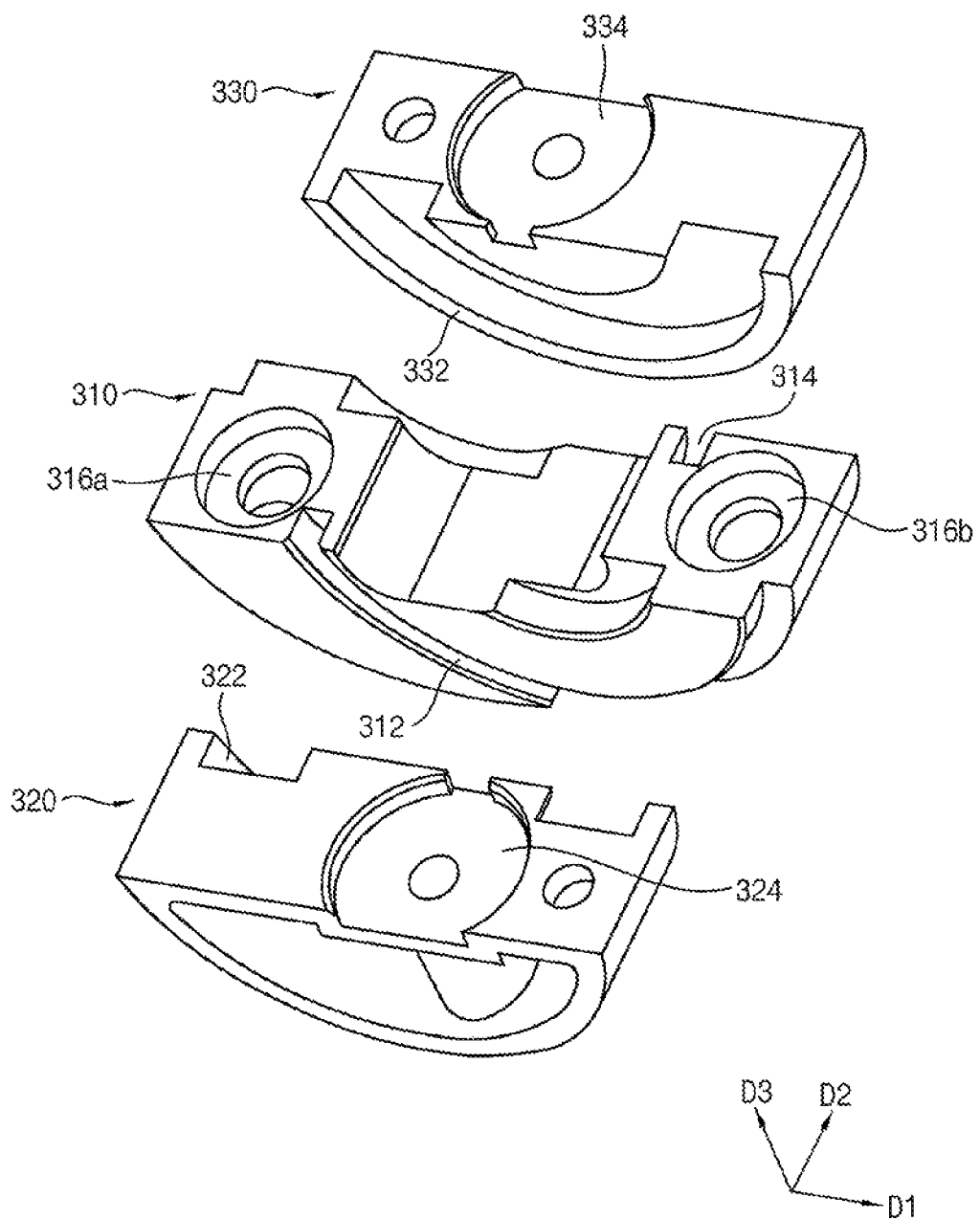
FIG. 7 is an exploded perspective view of the third assembly 300 of a display apparatus of FIG. 6.

FIG. 6 is a perspective view of a third assembly 300 of a display apparatus of FIG. 1. FIG. 7 is an exploded perspective view of the third assembly 300 of a display apparatus of FIG. 6. The fourth assembly 400 is substantially identical to the third assembly 300, and thus a repeated detailed description of the fourth assembly 400 will be omitted.

Referring to FIGS. 3, 6, and 7, according to an embodiment, the third assembly 300 is an auxiliary guide for the folding of the first plate PL1 and the second plate PL2. Unlike the first assembly 100, the third assembly 300 does not include a cam slider.

According to an embodiment, the third assembly 300 includes a guide 310, a first rotation part 320 and a second rotation part 330.

According to an embodiment, the first rotation part 320 has a semi-cylindrical shape as a whole. A first rotation guide coupling portion 322 is formed on a surface that faces the guide 310, and a plate connecting portion 324 is formed on a surface normal to the third direction D3 in the drawing.

According to an embodiment, the first rotation part 320 is fixed on the bottom surface of the first plate PL1 by the plate connecting portion 324. For example, the plate connecting portion 324 has a recess formed thereon that receives a protrusion on the bottom surface of the first plate PL1, and a fixing member such as a screw is received in the plate connecting portion 324 to fix the first rotation part 320 onto the bottom surface of the first plate PL1.

According to an embodiment, the first rotation guide coupling portion 322 couples to a first rotation guide 312 of the guide 310 to guide the rotation of the first rotation part 320.

According to an embodiment, the second rotation part 330 has a semi-cylindrical shape as a whole. A second rotation guide coupling portion 332 is formed on a surface that faces the guide 310, and a plate connecting portion 334 is formed on a surface normal to the third direction D3.

According to an embodiment, the second rotation part 330 is fixed onto the bottom surface of the second plate PL2 by the plate connecting portion 334. For example, the plate connecting portion 334 has a recess formed thereon that receives a protrusion on the bottom surface of second plate PL2, and a fixing member such as a screw is received in the plate connecting portion 334 to fix the second rotation part 330 onto the bottom surface of the second plate PL2.

According to an embodiment, the second rotation guide coupling portion 332 is coupled to the second rotation guide 314 of the guide 310 to guide a rotation of the second rotation part 330.

According to an embodiment, the guide 310 includes the first rotation guide 312 and the second rotation guide 314.

According to an embodiment, the first rotation guide 312 couples to the first rotation guide coupling portion 322 of the first rotation part 320 to guide the rotation of the first rotation part 320. The second rotation guide 314 couples to the second rotation guide coupling portion 332 of the second rotation part 330 to guide the rotation of the second rotation part 330.

For example, according to an embodiment, each of the first rotation guide 312 and the second rotation guide 314 is a groove formed on the guide 310. The first rotation guide coupling portion 322 and the second rotation guide coupling portion 332 are protrusions on the first rotation part 320 and the second rotation part 330, respectively, that protrude toward the guide 310.

According to an embodiment, the guide 310 further includes a first screw hole 316a and a second screw hole 316b. The guide 310 is fixed to the cover CV by using a fixing member such as a screw in the first screw hole 316a and the second screw hole 316b.

Figure 8A:
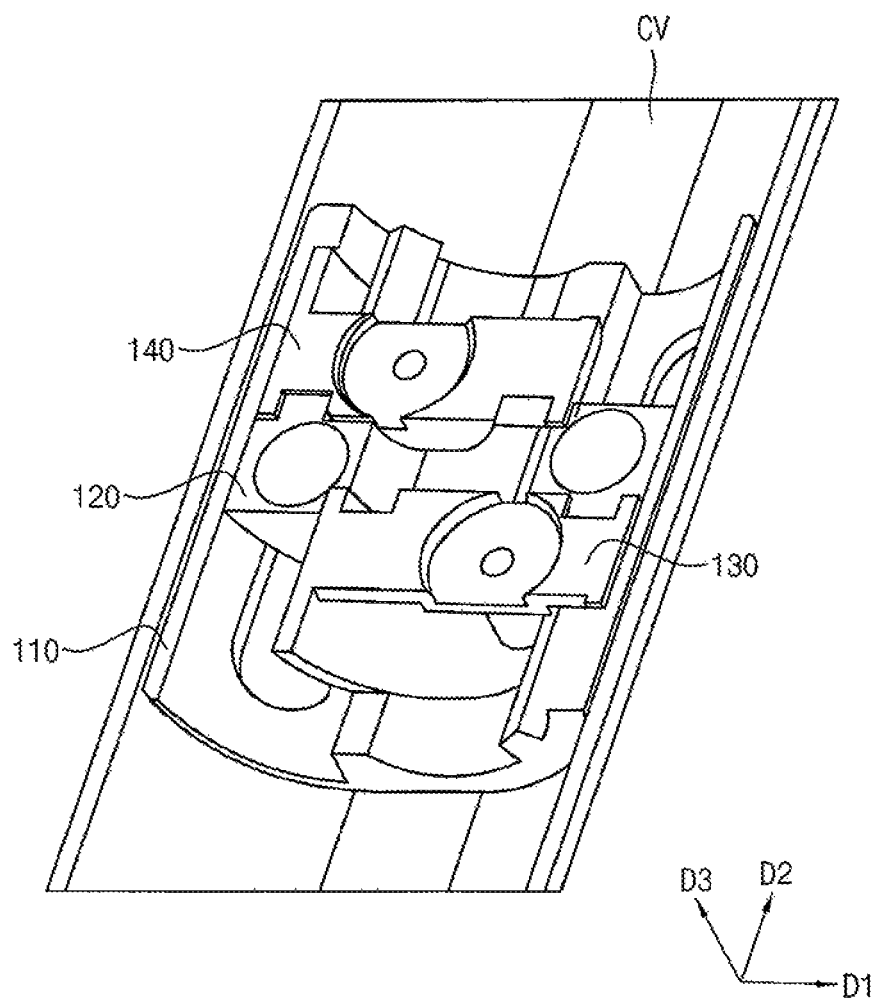
FIGS. 8A to 8C illustrate an operation of a first assembly when a display apparatus of FIG. 1 is folded.
Figure 8B:
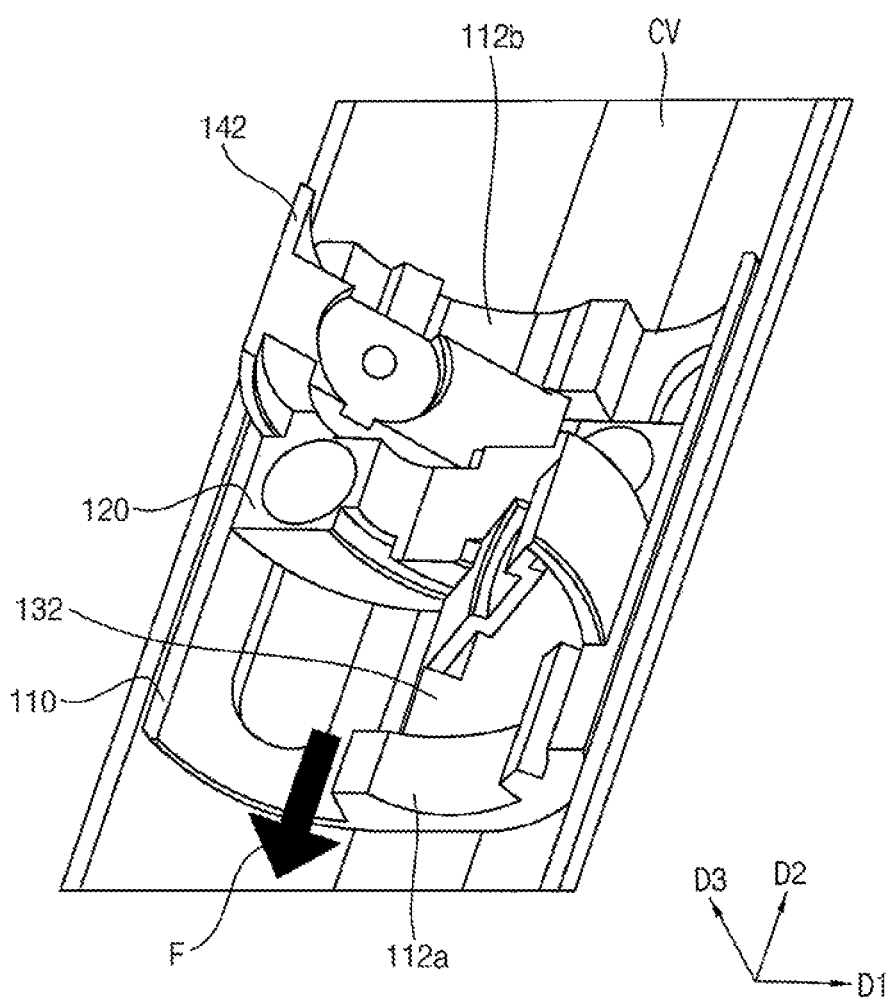
Figure 8C:
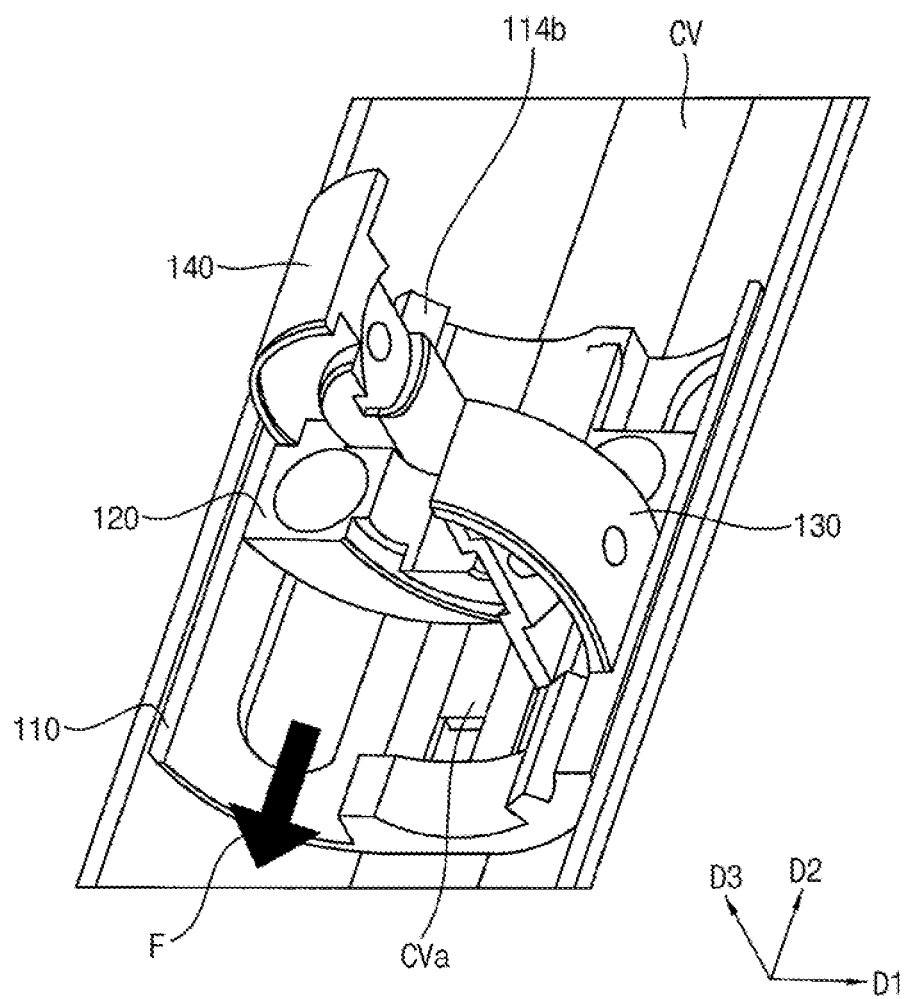

FIGS. 8A to 8C illustrate an operation of a first assembly when a display apparatus of FIG. 1 is folded.

Referring to FIG. 8A, according to an embodiment, the cover CV of the first assembly, the cam slider 110, the cam guide 120, the first cam rotation part 130 and the second cam rotation part 140 are shown when the display apparatus is unfolded.

Referring to FIG. 8B, according to an embodiment, the flexible display panel of the display apparatus is shown when the display apparatus is folded. As the first plate PL1 and the second plate PL2 are folded, the first cam rotation part 130 and the second cam rotation part 140 are guided and rotated by the cam guide 120. Here, the first cam inclined portion 132 of the first cam rotation part 130 pushes the first cam guide 112a of the cam slider 110 in a direction F opposite to the second direction D2. Accordingly, the second cam guide 112b pushes the second cam inclined portion 142 of the second cam rotation part 140 so that the second cam rotation part 140 rotates. Accordingly, the first cam rotation part 130 and the second cam rotation part 140 symmetrically rotate to the same degree. Thus, the display apparatus can be symmetrically folded, and even if the display apparatus is repeatedly folded and unfolded, it is possible to minimize wrinkles of the foldable area FA of the flexible display panel DP.

Referring to FIG. 8C, according to an embodiment, a folded display apparatus is shown. However, even when the display apparatus is unfolded, symmetrical rotation occurs similar to the above description.

Figure 9A:
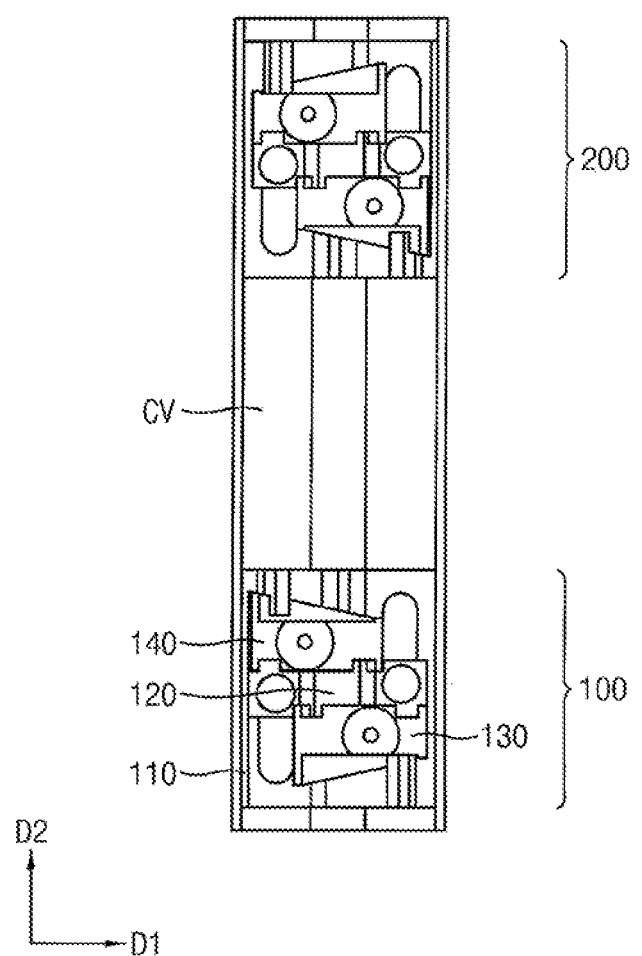
Figure 9B:
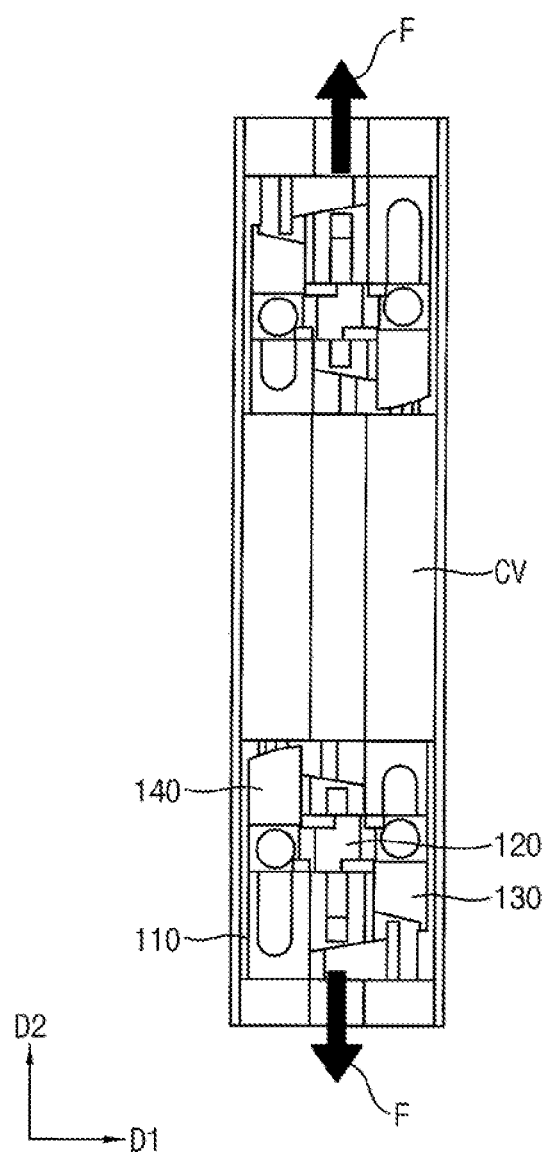

FIGS. 9A to 9C illustrate operations of the first and second assemblies when a display apparatus of FIG. 1 is folded and unfolded.

Referring to FIGS. 9A to 9C, according to an embodiment, the first assembly 100 and the second assembly 200 have the same configuration and are installed opposite to each other. That is, the first assembly 100 and the second assembly 200 have the same configuration, and are symmetrically disposed with respect to a center of a display apparatus in a plan view.

Accordingly, according to an embodiment, a slide direction of the cam slider 110 of the first assembly 100 and a slide direction of the cam slider of the second assembly 200 are opposite to each other.

That is, according to an embodiment, when a display apparatus is folded, the cam slider 110 of the first assembly 100 slides downward in the drawing, and the cam slider of the second assembly 200 slides upward, as indicated by arrows F of FIG. 9B.

In addition, according to an embodiment, when a display apparatus is unfolded, the cam slider 110 of the first assembly 100 slides upward in the drawing, and the cam slider of the second assembly 200 slides downward, as indicated by arrows F in FIG. 9C.

Accordingly, according to an embodiment, as the first assembly 100 and the second assembly 200 are symmetrically disposed with respect to each other, the folding and unfolding of the display apparatus can be more stably performed.

FIGS. 10A and 10B are cross-sectional views of a periphery of the first assembly when a display apparatus of FIG. 1 is unfolded and folded.

Referring to FIGS. 3, 10a and 10b, according to an embodiment, the first plate PL1 is rotated about the first rotation axis C1 by the cam slider 110, the cam guide 120, the first cam rotation part 130 and the second cam rotation part 140 of the first assembly. At the same time, the second plate PL2 rotates about the second rotation axis C2. In this case, the first rotation axis and the second rotation axis C1 and C2 are located on or above the surfaces of the first and second plates PL1 and PL2 in the unfolded state, shown in FIG. 10A. For example, in the unfolded state, the first and second rotation axes C1 and C2 are located in the flexible display panel DP. The first and second rotation axes C1 and C2 are spaced apart from each other. Alternatively, according to another embodiment, the first and second rotation shafts C1 and C2 coincide with each other.

On the other hand, according to an embodiment, when the first rotation axis and the second rotation axis C1 and C2 are located in the hinge assembly HA or located below the flexible display panel DP, wrinkles can formed in the foldable area FA of the flexible display panel DP since the flexible display panel DP stretches and shrinks, if folding and unfolding are repeated. However, according to a present embodiment, since the first and second rotation shafts C1 and C2 are positioned on or above the surfaces of the first and second plates PL1 and PL2, even if the display apparatus is repeatedly folded and unfolded, it is possible to minimize wrinkles of the foldable area FA of the flexible display panel DP.

Figure 11:
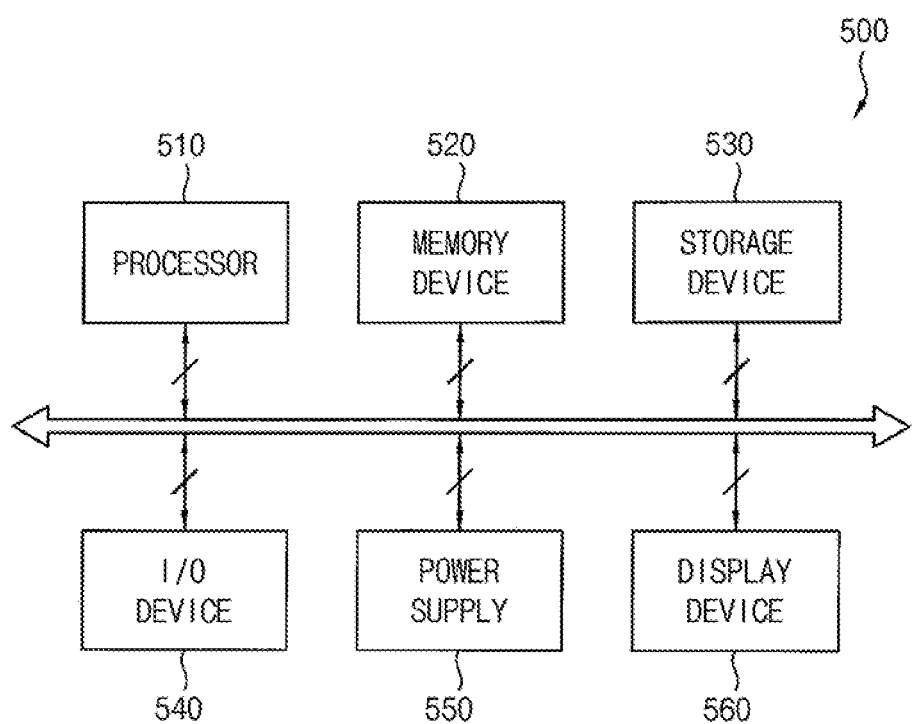
FIG. 11 is a block diagram of an electronic device according to exemplary embodiments.
Figure 12:
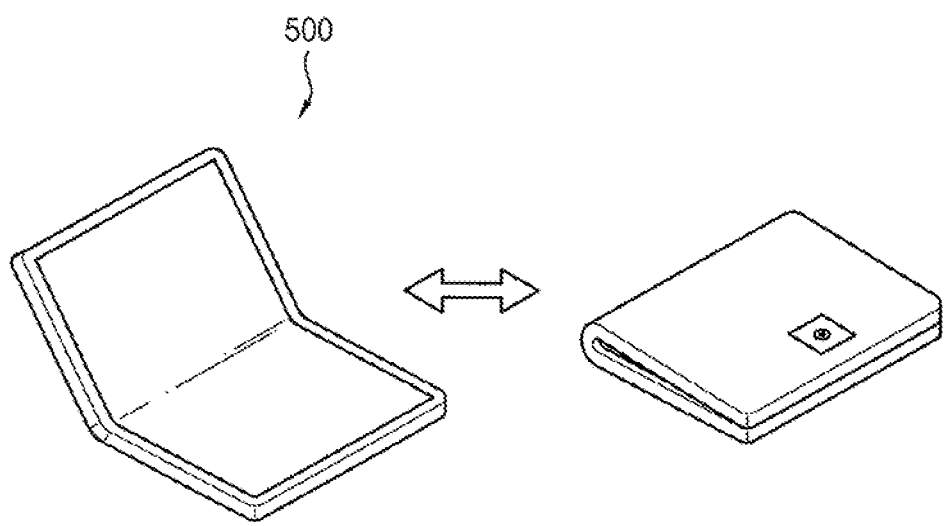
FIG. 12 illustrates an example in which an electronic device of FIG. 11 is a smart phone.

FIG. 11 is a block diagram of an electronic device according to exemplary embodiments. FIG. 12 illustrates an example in which an electronic device of FIG. 11 is a smart phone.

Referring to FIGS. 11 through 12, according to an embodiment, an electronic device 500 includes a processor 510, a memory device 520, a storage device 530, an input/output (I/O) device 540, a power supply 550, and a display apparatus 560. Here, the display apparatus 560 corresponds to the display apparatus of FIG. 1. In addition, the electronic device 500 further includes a plurality of ports for communicating with a video card, a sound card, a memory card, a universal serial bus (USB) device, other electronic devices, etc. In an exemplary embodiment, the electronic device 500 is a television. In another exemplary embodiment, illustrated in FIG. 12, the electronic device 500 is a smart phone. However, embodiments of the electronic device 500 are not limited thereto. For example, the electronic device 500 may be one of a cellular phone, a video phone, a smart pad, a smart watch, a tablet PC, a car navigation system, a computer monitor, a laptop, or a head mounted display (HMD), etc.

According to an embodiment, the processor 510 performs various computing functions. The processor 510 may be one of a micro processor, a central processing unit (CPU), an application processor (AP), etc. The processor 510 is coupled to other components via one of an address bus, a control bus, a data bus, etc. Further, the processor 510 is coupled to an extended bus such as a peripheral component interconnection (PCI) bus. The memory device 520 stores data for operations of the electronic device 500. For example, the memory device 520 includes at least one non-volatile memory device such as an erasable programmable read-only memory (EPROM) device, an electrically erasable programmable read-only memory (EEPROM) device, a flash memory device, a phase change random access memory (PRAM) device, a resistance random access memory (RRAM) device, a nano floating gate memory (NFGM) device, a polymer random access memory (PoRAM) device, a magnetic random access memory (MRAM) device, or a ferroelectric random access memory (FRAM) device, etc, and/or at least one volatile memory device such as a dynamic random access memory (DRAM) device, a static random access memory (SRAM) device, or a mobile DRAM device, etc. The storage device 530 may be one or more of a solid state drive (SSD) device, a hard disk drive (HDD) device, or a CD-ROM device, etc. The I/O device 540 includes an input device such as a keyboard, a keypad, a mouse device, a touchpad, or a touch-screen, etc., and an output device such as a printer or a speaker, etc. The power supply 550 provides power for operations of the electronic device 500.

According to an embodiment, the display apparatus 560 is coupled to other components via the buses or other communication links. In some exemplary embodiments, the display apparatus 560 is included in the I/O device 540. As described above, the display apparatus 560 includes a flexible display panel, a first plate, a second plate, and a hinge assembly. The first plate rotates about a first rotation axis. At the same time, the second plate rotates about a second rotation axis. The display apparatus can be symmetrically folded. Accordingly, even if the display apparatus is repeatedly folded and unfolded, it is possible to minimize wrinkles of the foldable area of the flexible display panel.

In addition, according to an embodiment, the hinge assembly includes a first assembly that includes a cam slider, a cam guide, a first cam rotation part and a second cam rotation part. In this case, the first rotation axis and the second rotation axis are positioned on or above the surfaces of the first and second plates in an unfolded state. Accordingly, even if the display apparatus is repeatedly folded and unfolded, it is possible to minimize wrinkles of the foldable area of the flexible display panel. However, since this has been described above, a duplicate description thereof will be omitted.

Embodiments of the present disclosure can be incorporated into organic light emitting display devices and various other electronic devices that include the same. For example, embodiments of the present disclosure can be incorporated into a mobile phone, a smart phone, a video phone, a smart pad, a smart watch, a tablet PC, a car navigation system, a television, a computer monitor, a notebook, etc.

The foregoing is illustrative of embodiments of the inventive concept and is not to be construed as limiting thereof. Although a few exemplary embodiments of the inventive concept have been described, those skilled in the art will readily appreciate that many modifications are possible in the exemplary embodiments without materially departing from the novel teachings and advantages of the inventive concept. Accordingly, all such modifications are intended to be included within the scope of the inventive concept as defined in the claims. Therefore, it is to be understood that the foregoing is illustrative of the inventive concept and is not to be construed as limited to the specific exemplary embodiments disclosed, and that modifications to the disclosed exemplary embodiments, as well as other exemplary embodiments, are intended to be included within the scope of the appended claims. Embodiments of the inventive concept are defined by the following claims, with equivalents of the claims to be included therein.

What is claimed is:
1. A foldable display apparatus, comprising:
a flexible display panel;
a first plate and a second plate that support the flexible display panel and are disposed in the same plane when the foldable display apparatus is in an unfolded state; and
a hinge assembly coupled to the first plate and the second plate wherein the first plate rotates about a first rotation axis and at the same time the second plate rotates about a second rotation axis, and
wherein the first rotation axis and second rotation axis are located on or above surfaces of the first and second plates in the unfolded state,
wherein the hinge assembly comprises:
a first assembly that includes
a first cam rotation part fixed onto a lower surface of the first plate,
a second cam rotation part fixed onto a lower surface of the second plate,
a cam guide disposed between the first cam rotation part and the second cam rotation part to guide rotation of the first and second cam rotation parts, and
a cam slider that slides parallel to a direction of the first rotation axis and second rotation axis in accordance with rotations of the first and second cam rotation parts; and
a cover that receives the first assembly, wherein the cam guide is fixed to the cover.
2. The foldable display apparatus of claim 1, wherein the cam guide includes a first rotation guide and a second rotation guide, the first cam rotation part of the first assembly includes a first rotation guide coupling portion coupled to the first rotation guide of the cam guide, and a first cam inclined portion formed on an opposite surface of the first rotation guide coupling portion, and the second cam rotation part of the first assembly includes a second rotation guide coupling portion coupled to the second rotation guide of the cam guide, and a second cam inclined portion formed on an opposite surface of the second rotation guide coupling portion.

3. The foldable display apparatus of claim 2, wherein the cam slider of the first assembly comprises:
a first cam guide that guides the first cam inclined portion of the first cam rotation part; and
a second cam guide that guides the second cam inclined portion of the second cam rotation part.

4. The foldable display apparatus of claim 3, wherein in the unfolded state, the first cam inclined portion and the second cam inclined portion are inclined in a same direction, and the first cam inclined portion and the second cam inclined portion are spaced apart opposite in directions with the cam guide therebetween.

5. The foldable display apparatus of claim 3, wherein the cam slider of the first assembly comprises:
a first fixed portion adjacent to the first cam guide and that limits a rotation range of the first cam rotation part; and
a second fixed portion adjacent to the second cam guide and that limits a rotation range of the second cam rotation part.

6. The foldable display apparatus of claim 3, wherein the cam slider of the first assembly includes a slide opening that extends in a direction parallel to the first rotation axis and the second rotation axis, and
the cam guide is fixed to the cover by a fixing member that passes through the slide opening.

7. The foldable display apparatus of claim 6, wherein the cover includes a slide protrusion, and
the cam slider of the first assembly includes a slide guide portion that receives the slide protrusion.

8. The foldable display apparatus of claim 1, where the hinge assembly further comprises a second assembly received in the cover,
wherein the second assembly includes:
a first cam rotation part fixed onto the lower surface of the first plate;
a second cam rotation part fixed onto the lower surface of the second plate;
a cam guide disposed between the first cam rotation part and the second cam rotation part and that guides rotation of the first and second cam rotation parts; and
a cam slider that slides parallel to the direction of the first rotation axis and the second rotation axis in accordance with rotations of the first and second rotation parts, and
wherein the first assembly and the second assembly are symmetrically arranged with respect to a center of the display apparatus in a plan view.

9. The foldable display apparatus of claim 8, wherein when the display apparatus is folded or unfolded, a sliding direction of the cam slider of the first assembly is opposite to a sliding direction of the cam slider of the second assembly.

10. The foldable display apparatus of claim 1, wherein the hinge assembly further comprises:
a third assembly received in the cover,
wherein the third assembly comprises:
a first rotation part fixed onto the lower surface of the first plate;
a second rotation part fixed onto the lower surface of the second plate; and
a guide fixed at the cover and disposed between the first rotation part and the second rotation part that guides rotation of the first and second rotation parts.

11. The foldable display apparatus of claim 1, wherein the first rotation axis and the second rotation axis are spaced apart from each other.

12. The foldable display apparatus of claim 1, wherein in the unfolded state, the first and second rotation axes are located in the flexible display panel.

13. A display apparatus, comprising:
a flexible display panel;
a first plate and a second plate that support the flexible display panel; and
a hinge assembly coupled to the first plate and the second plate,
wherein the hinge assembly includes:
a first assembly that includes
a first cam rotation part fixed onto a lower surface of the first plate,
a second cam rotation part fixed onto a lower surface of the second plate,
a cam guide disposed between the first cam rotation part and the second cam rotation part and that guides rotation of the first and second cam rotation parts, and
a cam slider that slides parallel to a direction of a first rotation axis and a second rotation axis in accordance with rotations of the first and second cam rotation parts; and
a cover that receives the first assembly, wherein the cam guide is fixed to the cover,
wherein the first rotation axis and the second rotation axis are located on or above surfaces of the first and second plates when the display apparatus is in an unfolded state.

14. The display apparatus of claim 13, wherein
the cam guide includes a first rotation guide and a second rotation guide,
the first cam rotation part of the first assembly includes a first rotation guide coupling portion coupled to the first rotation guide of the cam guide, and a first cam inclined portion formed on an opposite surface of the first rotation guide coupling portion, and
the second cam rotation part of the first assembly includes a second rotation guide coupling portion coupled to the second rotation guide of the cam guide, and a second cam inclined portion formed on an opposite surface of the second rotation guide coupling portion.

15. The display apparatus of claim 13, wherein
the flexible display panel includes a first rigid area fixed to the first plate, a second rigid area fixed to the second plate, and a foldable area disposed between the first rigid area and the second rigid area,
when the display apparatus is folded, the foldable area is spaced apart from the first and second plates, and
when the display apparatus is unfolded, the foldable area is in contact with the first and second plates.

16. The display apparatus of claim 15, wherein the first and second rotation axes are located in the flexible display panel when the flexible display panel is unfolded.

17. The display apparatus of claim 13, wherein the hinge assembly further comprises a second assembly received in the cover,
wherein the second assembly includes:
a first cam rotation part fixed onto the lower surface of the first plate;

a second cam rotation part fixed onto the lower surface of the second plate;

a cam guide disposed between the first cam rotation part and the second cam rotation part and that guides rotation of the first and second cam rotation parts; and a cam slider that slides parallel to the direction of the first rotation axis and the second rotation axis in accordance with rotations of the first and second rotation parts.

* * * * *